(12) United States Patent
Fan Chiang et al.

(10) Patent No.: US 8,436,562 B2
(45) Date of Patent: May 7, 2013

(54) BI-POWER MOTOR CONTROLLING SYSTEM AND MOTOR CONTROLLING APPARATUS THEREOF

(75) Inventors: Chao-Wei Fan Chiang, Taoyuan Hsien (TW); Po-Tsun Kuo, Taoyuan Hsien (TW); Chia-Feng Wu, Taoyuan Hsien (TW); Chun-Lung Chiu, Taoyuan Hsien (TW)

(73) Assignee: Delta Electronics, Inc., Kuei San, Taoyuan Hsien (TW)

( * ) Notice: Subject to any disclaimer, the term of this patent is extended or adjusted under 35 U.S.C. 154(b) by 431 days.

(21) Appl. No.: 12/774,189

(22) Filed: May 5, 2010

(65) Prior Publication Data

US 2010/0289438 A1 Nov. 18, 2010

(30) Foreign Application Priority Data

May 12, 2009 (TW) .............................. 98115628 A

(51) Int. Cl.
*H02P 6/00* (2006.01)
(52) U.S. Cl.
USPC .............. 318/400.29; 318/400.3; 318/400.17

(58) Field of Classification Search ............. 318/400.29, 318/400.3, 400.17, 434, 599, 268; 388/727
See application file for complete search history.

(56) References Cited

U.S. PATENT DOCUMENTS 7,233,121 B2 * 6/2007 Wu et al. .................. 318/400.17

* cited by examiner

*Primary Examiner* — Karen Masih
(74) *Attorney, Agent, or Firm* — Muncy, Geissler, Olds & Lowe, PLLC

(57) ABSTRACT

A bi-power motor controlling system includes a motor, a system apparatus and a motor controlling apparatus. The system apparatus has a rotational-speed target value for determining the targeted rotational speed of the motor. In addition, the system apparatus outputs a first power and a second power to the motor and the motor controlling apparatus, respectively. The motor controlling apparatus detects the motor to obtain a first rotational-speed value of the motor, and then adjusts the rotational speed of the motor to a second rotational-speed value according to the first rotational-speed value. Then, the motor controlling apparatus further generates a rotational-speed feedback signal to the system apparatus. The system apparatus adjusts the outputted first power in accordance with the rotational-speed feedback signal to make the rotational speed of the motor reach the rotational-speed target value.

29 Claims, 8 Drawing Sheets

BI-POWER MOTOR CONTROLLING SYSTEM AND MOTOR CONTROLLING APPARATUS THEREOF

CROSS REFERENCE TO RELATED APPLICATIONS

This Non-provisional application claims priority under 35 U.S.C. §119(a) on Patent Application Ser. No. 098115628 filed in Taiwan, Republic of China on May 12, 2009, the entire contents of which are hereby incorporated by reference.

BACKGROUND OF THE INVENTION

1. Field of Invention

The present invention relates to a bi-power motor controlling system and a motor controlling apparatus thereof that can reduce the current and thus improve the noise problem.

2. Related Art

As shown in FIG. 1A, a conventional motor controlling system 1A mainly includes a driver 10 and a coil 11, which is electrically connected with the driver 10. The driver 10 is electrically connected with a power generator 12 for receiving a power $V_{CC}$ from the power generator 12. Then, the driver receives the desired operation voltage from the power $V_{CC}$ and outputs a driving current to the coil 11 accordingly.

In addition, FIG. 1B discloses another conventional motor controlling system 1B, which is different from the above-mentioned motor controlling system 1A in that the driver 10 of the motor controlling system 1B is electrically connected with a plurality of coils 11 (FIG. 1B shows two coils 11).

Both of the conventional motor controlling systems 1A and 1B control the rotational speed of the motor by changing the power $V_{CC}$. However, this kind method for controlling the rotational speed is limited by the operation voltage of the driver 10, which uses the same power source, so that the controllable rotational-speed range is too narrow. Thus, it is gradually unable to satisfy the demands of industry.

SUMMARY OF THE INVENTION

To achieve the above-mentioned problem, the present invention is to provide a bi-power motor controlling system, which has a pulse width modulation module for adjusting the duty cycle of the control signal inputted into the motor to lower the rotational speed of the motor. In addition, in order to make the rotational speed of the motor reach the rotational-speed target value, the power voltage inputted into the motor is increased so as to reduce the current flowing through the motor and improve the noise of the motor.

To achieve the above, the present invention discloses a bi-power motor controlling system including a motor, a system apparatus and a motor controlling apparatus, which is electrically connected with the motor and the system apparatus. The system apparatus has a rotational-speed target value for determining a targeted rotational speed of the motor, and outputs a first power and a second power to the motor and the motor controlling apparatus, respectively. The motor controlling apparatus detects a phase commutation of the motor to obtain a first rotational-speed value of the motor, adjusts a rotational speed of the motor to a second rotational-speed value in accordance with the first rotational-speed value, and generates a rotational-speed feedback signal to the system apparatus. Then, the system apparatus can adjust the outputted first power in accordance with the rotational-speed feedback signal to make the rotational speed of the motor reach the rotational-speed target value.

In addition, the present invention further discloses a motor controlling apparatus electrically connected with a motor. The motor controlling apparatus and the motor receive a first power and a second power, respectively, from outside, and the first power is an adjustable voltage signal. The motor controlling apparatus includes a sensor, a controller, a driving circuit and a pulse width modulation module. The controller is electrically connected with the sensor and the driving circuit, and the driving circuit is further electrically connected with the motor. The pulse width modulation module is installed inside the controller. The sensor is used to detect a phase commutation of the motor to generate a phase-commutation sensing signal. The controller receives the phase-commutation sensing signal and the second power, and retrieves a first rotational-speed value of the motor in accordance with the phase-commutation sensing signal. The pulse width modulation module modulates the control signal in accordance with the first rotational-speed value and then outputs the control signal to the driving circuit. Then, the driving circuit adjusts the rotational speed of the motor to a second rotational-speed value in accordance with the control signal.

These and other features, aspects, and advantages of the present invention will become better understood with regard to the following description, appended claims, and accompanying drawings.

DETAILED DESCRIPTION OF THE INVENTION

The present invention will be apparent from the following detailed description, which proceeds with reference to the accompanying drawings, wherein the same references relate to the same elements.

Figure 1B:
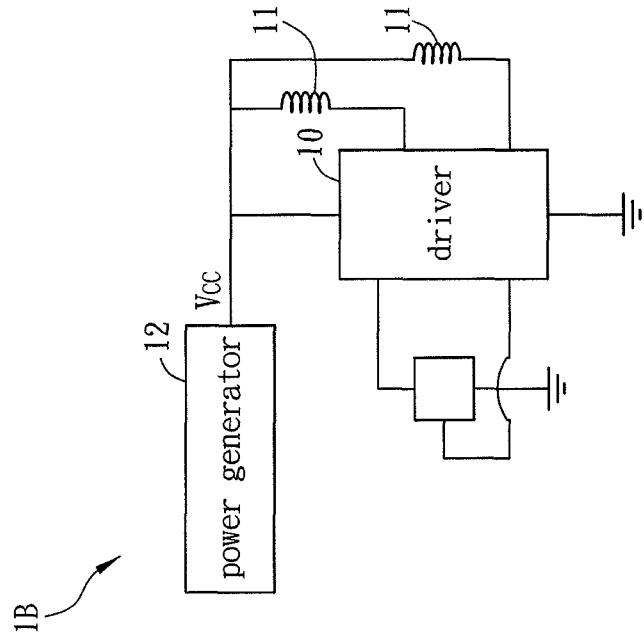
FIG. 1B is a schematic diagram of another conventional motor controlling system.
Figure 1A:
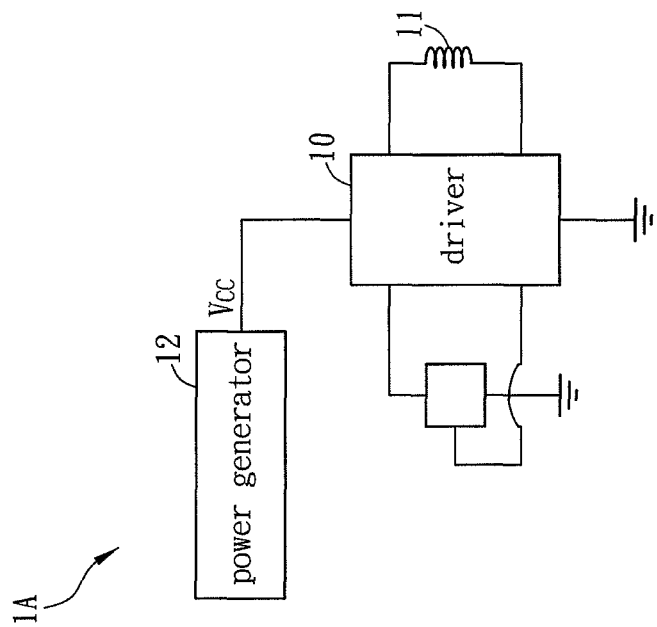
FIG. 1A is a schematic diagram of a conventional motor controlling system.
Figure 2:
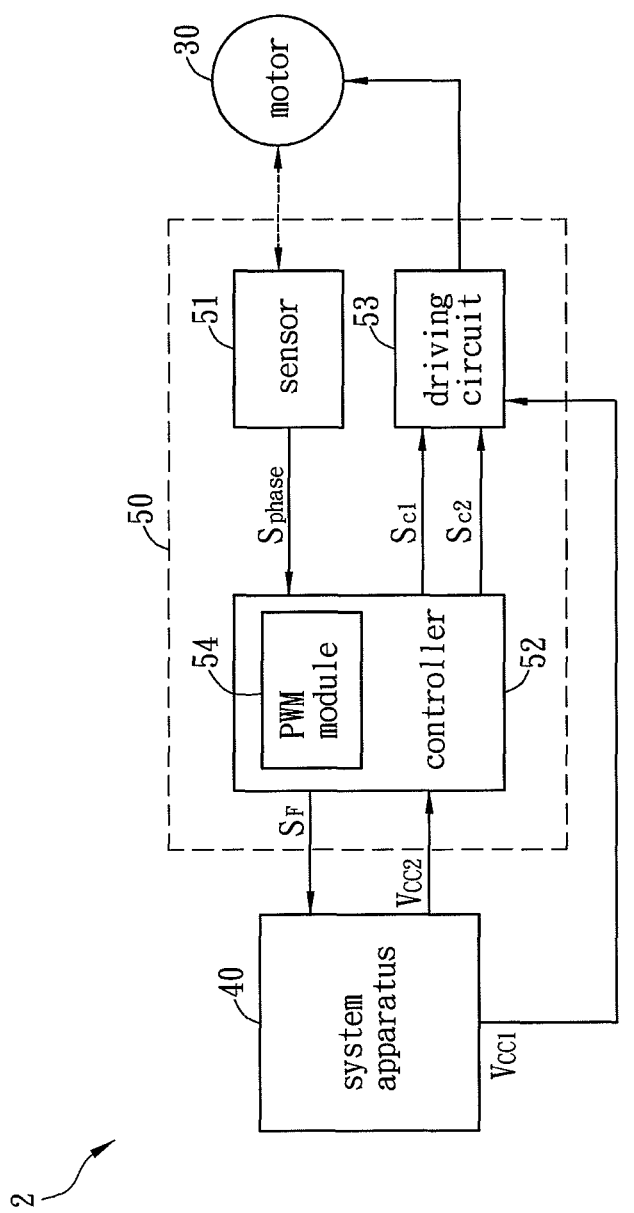
FIG. 2 is a block diagram showing a bi-power motor controlling system of the present invention.

With reference to FIG. 2, a bi-power motor controlling system 2 of the present invention mainly includes a motor 30, a system apparatus 40 and a motor controlling apparatus 50, which is electrically connected with the motor 30 and the system apparatus 40 respectively.

The system apparatus 40 has a rotational-speed target value for determining a targeted rotational speed of the motor 30. In addition, the system apparatus 40 is capable of generating a first power $V_{CC1}$ and a second power $V_{CC2}$, and the first power $V_{CC1}$ is an adjustable power signal and can be a DC voltage signal or a pulse-type power signal such as a triangle-wave signal or a square-wave signal. The system apparatus 40 outputs the first power $V_{CC1}$ to the motor 30 for controlling the rotational speed of the motor 30. The second power $V_{CC2}$ is a DC voltage signal and is supplied to the motor controlling apparatus 50.

The motor controlling apparatus 50 includes a sensor 51, a controller 52, a driving circuit 53 and a pulse width modulation module 54. The controller 52 is electrically connected with the system apparatus 40, the sensor 51 and the driving circuit 53, and the driving circuit 53 is electrically connected with the motor 30 and the system apparatus 40. The pulse width modulation module 54 is installed inside the controller 52.

In the present embodiment, the sensor 51 is, for example, a Hall element, which is used to detect the phase commutation of the motor 30 (i.e. the phase commutation between the N pole and S pole occurs in the coil of the motor 30) for generating a phase-commutation sensing signal $S_{phase}$. Then, the phase-commutation sensing signal $S_{phase}$ is outputted to the controller 52.

In the embodiment, the controller 52 is, for example, a microprocessor, which retrieves the current rotational speed (a first rotational-speed value) of the motor 30 in accordance with the received phase-commutation sensing signal $S_{phase}$ and transmits the current rotational speed (the first rotational-speed value) to the pulse width modulation module 54. In addition, the controller 52 further receives the second power $V_{CC2}$, which is supplied for the controller 52 to drive the motor 30 to rotate, and generates a plurality of driving signals in accordance with the second power $V_{CC2}$. Herein, each of the driving signals has a plurality of enable sections and a plurality of disable sections.

The pulse width modulation module 54 can perform a pulse width modulation (PWM) on at least two of the driving signals during the enable sections in accordance with the first rotational-speed value so as to generate at least two control signals $S_{c1}$ and $S_{c2}$. The controller 52 outputs the control signals $S_{c1}$ and $S_{c2}$ for adjusting (decreasing) the rotational speed of the motor 30 to a second rotational-speed value. The controller 52 also outputs a rotational-speed feedback signal $S_F$ to the system apparatus 40. In general, the second rotational-speed value is usually smaller than the first rotational-speed value.

Figure 3:
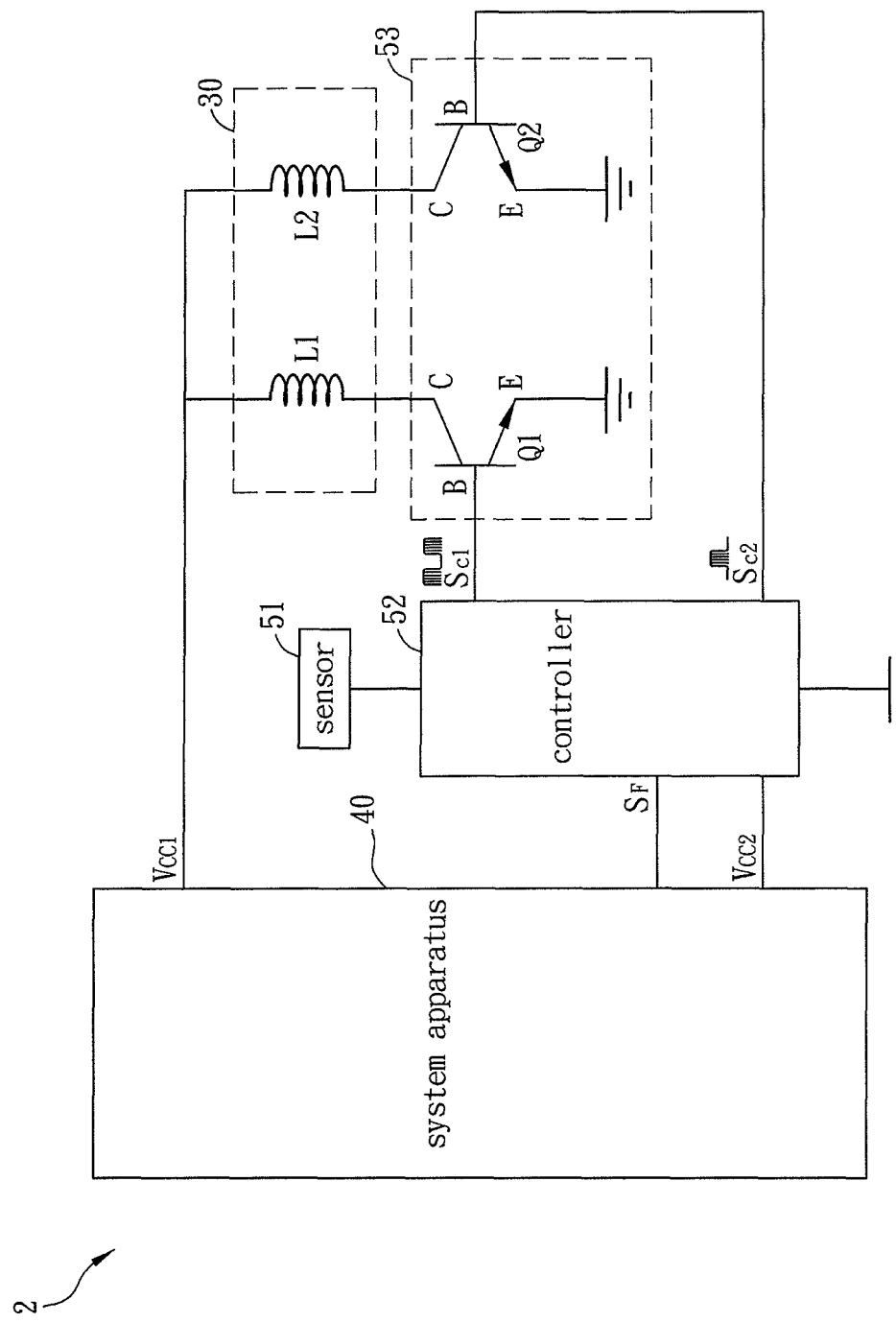
FIG. 3 is a circuit diagram of the bi-power motor controlling system of FIG. 2.
Figure 4:
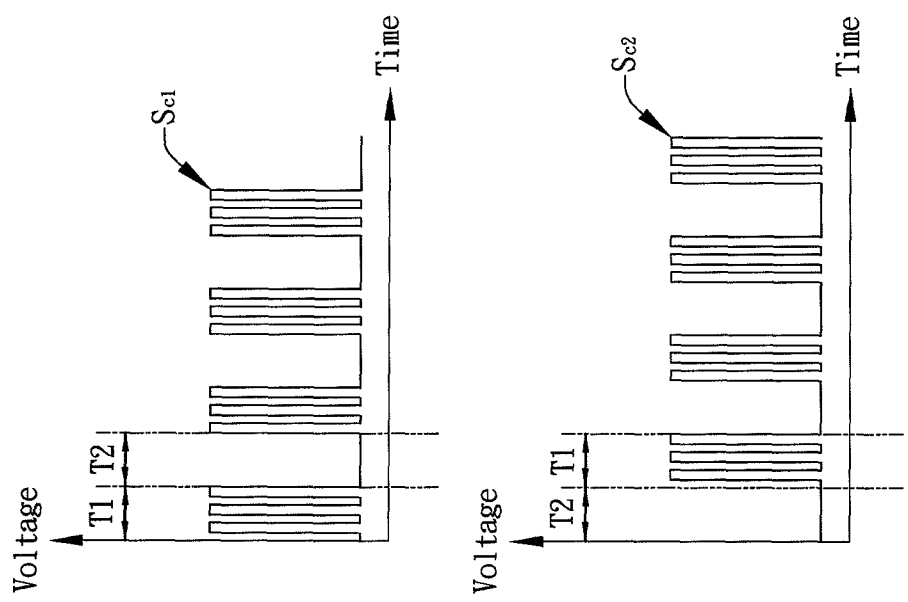
FIG. 4 is a schematic diagram showing the control signal of the bi-power motor controlling system of FIG. 3.

With reference to FIG. 3 in view of FIG. 4, the driving circuit 53 receives the first power $V_{CC1}$ and the control signals $S_{c1}$ and $S_{c2}$, and then drives the motor 30 to rotate according to the first power $V_{CC1}$ and the control signals $S_{c1}$ and $S_{c2}$. In this embodiment, the motor 30 has two coils L1 and L2, and the driving circuit 53 is a half-bridge circuit, which has two switch units Q1 and Q2. The first ends of the coils L1 and L2 are electrically connected with the system apparatus 40 for receiving the first power $V_{CC1}$ outputted by the system apparatus 40, and the second ends thereof are electrically connected with the corresponding switch units, respectively. In practice, the switch units of the present embodiment are transistors Q1 and Q2, the collectors C of the transistors Q1 and Q2 are electrically connected with the second ends of the coils L1 and L2, respectively, the emitters E thereof are grounded, and the bases B thereof are electrically connected with the controller 52 for respectively receiving the control signals $S_{c1}$ and $S_{c2}$ to control the turn-on or turn-off of the transistors Q1 and Q2. When there is current flowing through the coils L1 and L2 as they receive the first power $V_{CC1}$ and the transistors Q1 and Q2 are turned on, the coils L1 and L2 can induce a magnetic field for enabling the motor 30 to rotate. In this case, the transistor Q1 is turned on during the enable sections T1 of the control signal $S_{c2}$, and is turned off during the disable sections T2 of the control signal $S_{c2}$.

Figure 5:
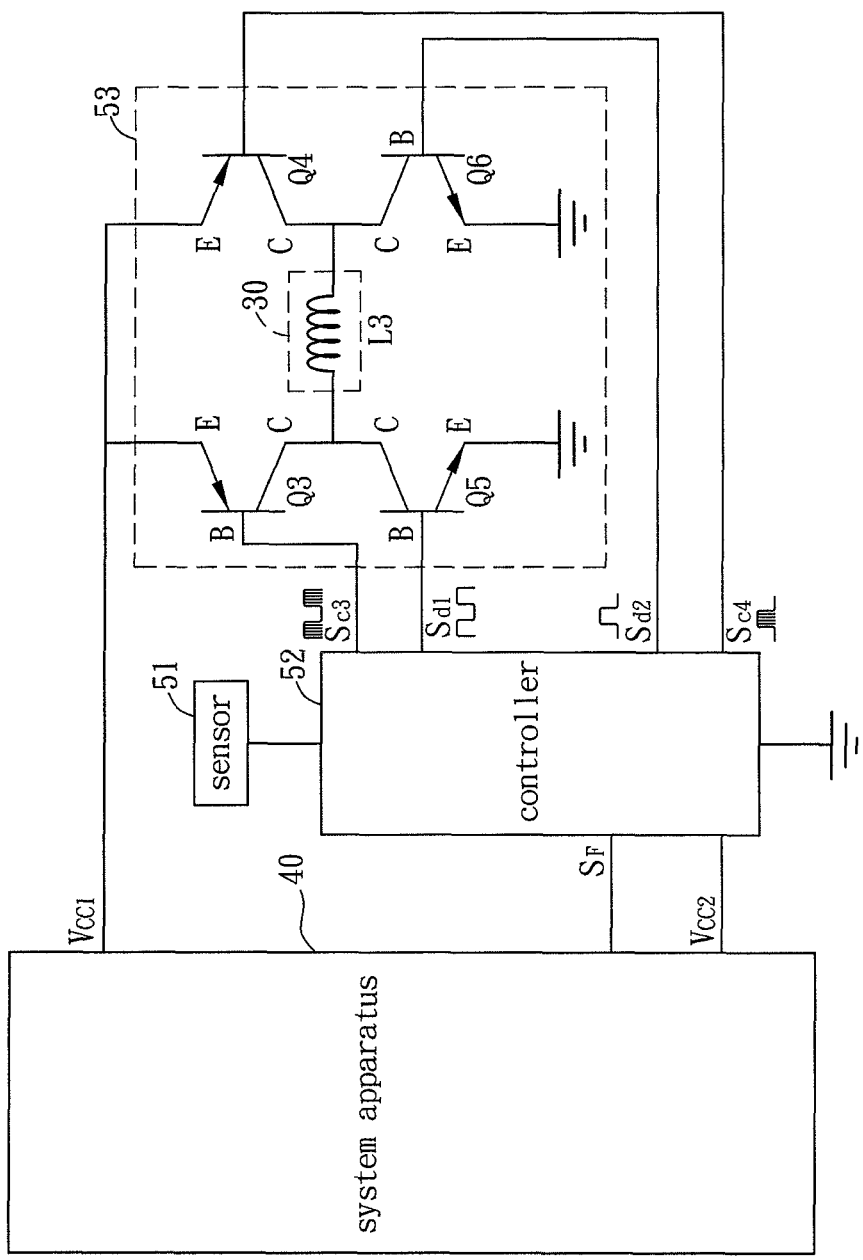
FIG. 5 is another circuit diagram of the bi-power motor controlling system of FIG. 2.
Figure 6:
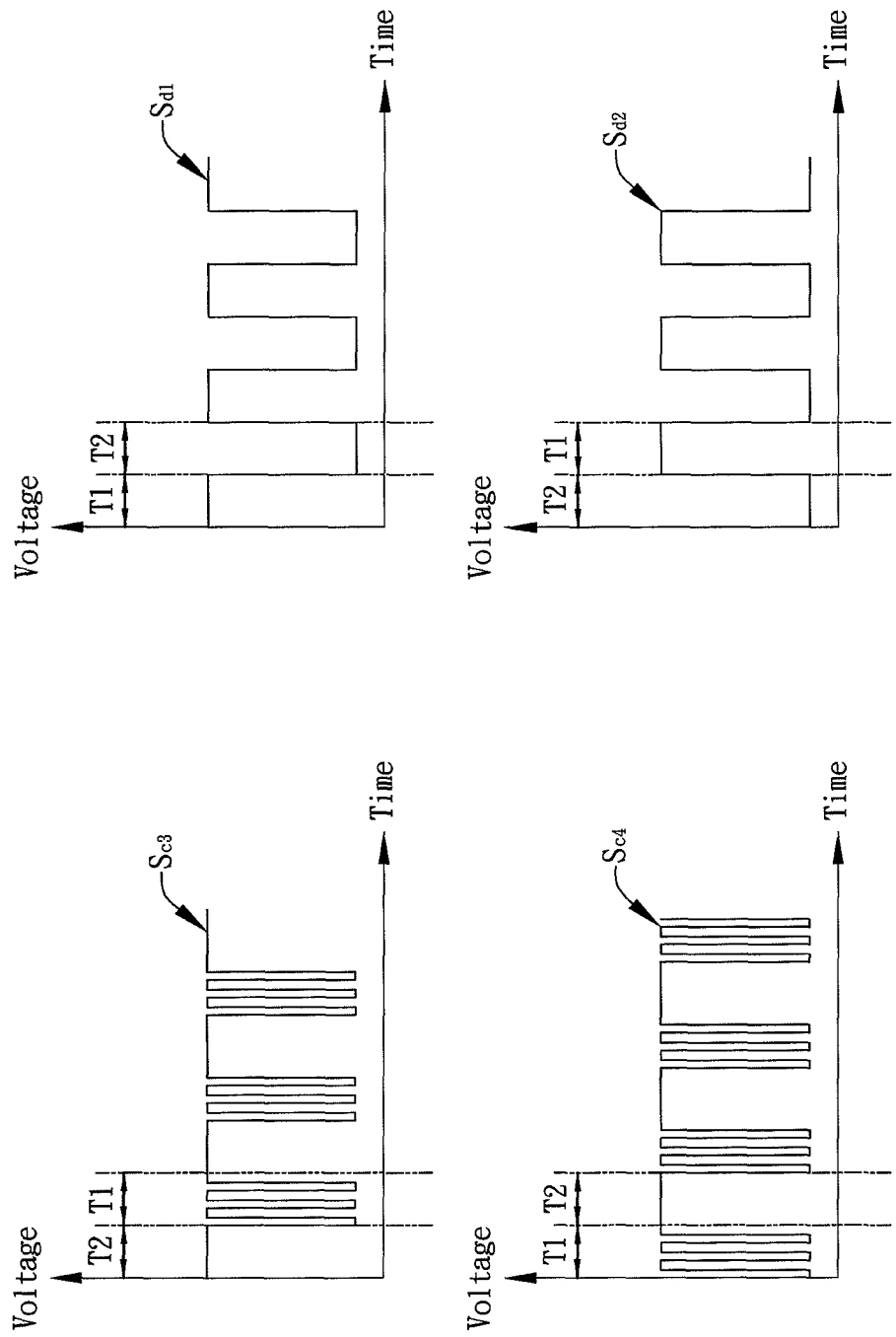
FIG. 6 is a schematic diagram showing the control signal and the driving signal of the bi-power motor controlling system of FIG. 5.

FIG. 5 in view of FIG. 6 shows another embodiment of the present invention, which is different from the previous embodiment in that the driving circuit 53 of the current embodiment is a full-bridge circuit composed of a coil L3 and four switch units (two in the top half-bridge and two in the bottom half-bridge). In practice, the four switch units are transistors Q3 to Q6, the collectors C of the transistors Q3 to Q6 are electrically connected with the coil L3, the bases B thereof are electrically connected with the controller 52, the emitters E of two transistors in the top half-bridge are electrically connected with the system apparatus 40, and the emitters E of two transistors in the bottom half-bridge are grounded. As mentioned above, two control signals $S_{c3}$ and $S_{c4}$ are used to control the transistors Q3 and Q4, and the controller 52 further outputs two driving signals $S_{d1}$ and $S_{d2}$ to control the transistors Q5 and Q6. Thus, the transistors Q3 to Q6 can be crossingly turned on and off, so that the direction of the current flowing through the coil L3 is alternately switched to drive the motor 50 to rotate.

To be noted, the top half-bridge (transistors Q3 and Q4) is controlled by the control signal with pulse width modulation, and the bottom half-bridge (transistors Q5 and Q6) is controlled by the driving signal that is a pulse-type signal.

Figure 7:
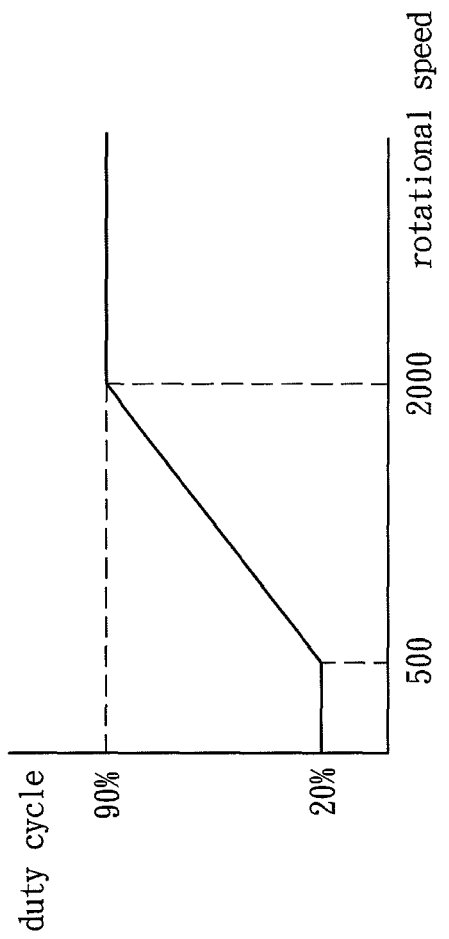
FIG. 7 is a schematic diagram showing the relation between the rotational speed and duty cycle of the motor of the bi-power motor controlling system of the present invention.
Figure 8A:
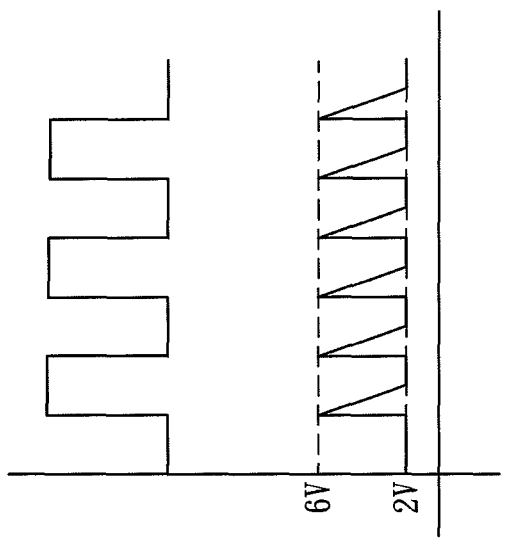
FIG. 8A is a schematic diagram showing the waveforms of the rotational speed of the motor and the voltage of the first power in the bi-power motor controlling system of the present invention (before the voltage is increased)
Figure 8B:
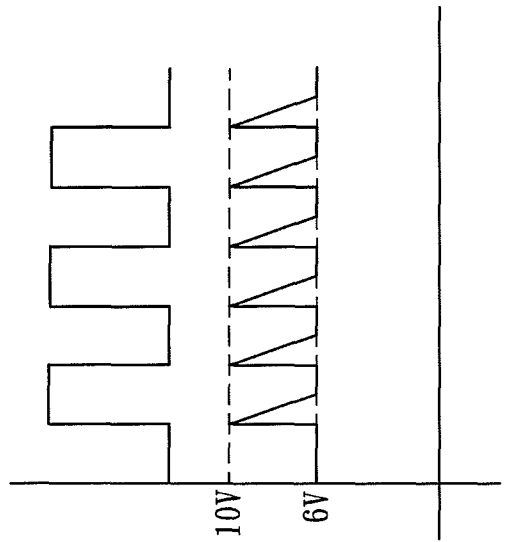
FIG. 8B is a schematic diagram showing the waveforms of the rotational speed of the motor and the voltage of the first power in the bi-power motor controlling system of the present invention (after the voltage is increased).

With reference to FIG. 2 again, the pulse width modulation module 54 is stored with a relation table or equation of the rotational speed and a duty cycle (as shown in FIG. 7), so that the pulse width modulation module 54 can modulate the duty cycle of the control signal $S_{c1}$ and $S_{c2}$ during the enable sections in accordance with the first rotational-speed value and the relation table or equation, thereby modulating the control signal to a pulse width modulation signal during the enable sections. For example, the pulse width modulation module 54 can process the control signal $S_{c1}$ and $S_{c2}$ with the pulse width modulation method during the enable sections to form a plurality of square waves, so that the duty cycle of the control signal $S_{c1}$ and $S_{c2}$ during the enable sections can be modulated so as to adjust (decrease) the rotational speed of the motor 30.

In addition, the pulse width modulation module 54 further has at least one rotational-speed threshold value, e.g. the upper rotational-speed threshold value of 2000 rpm and the lower rotational-speed threshold value of 500 rpm as shown in FIG. 7. When the rotational speed of the motor 30 (the first rotational-speed value) is greater than the upper rotational-speed threshold value or smaller than the lower rotational-speed threshold value, the pulse width modulation module 54 modulates the control signal $S_{c1}$ and $S_{c2}$ to be with a constant duty cycle during the enable sections. For example, when the rotational speed of the motor 30 is greater than 2000 rpm, the duty cycle of the control signal $S_{c1}$ and $S_{c2}$ during the enable sections is a constant value of 90%; otherwise, when the rotational speed of the motor 30 is smaller than 500 rpm, the duty cycle of the control signal $S_{c1}$ and $S_{c2}$ during the enable sections is a constant value of 20%. Alternatively, when the rotational speed of the motor 30 is between the upper rotational-speed threshold value and the lower rotational-speed threshold value (between 2000 rpm and 500 rpm), the pulse width modulation module 54 modulates the control signal $S_{c1}$ and $S_{c2}$ to be with a variable duty cycle during the enable sections. For example, the duty cycle of the control signal $S_{c1}$ and $S_{c2}$ during the enable sections may be ranged between 20% and 90%. During this period of variable duty cycle, the first rotational-speed value and the duty cycle are in direct proportion. When the first rotational-speed value retrieved by the pulse width modulation module 54 reflects that the motor 30 is in a lower rotational speed, the pulse width modulation module 54 decreases the duty cycle of the control signal $S_{c1}$ and $S_{c2}$ during the enable sections (form more square waves). When the first rotational-speed value retrieved by the pulse width modulation module 54 reflects that the motor 30 is in a high rotational speed, the pulse width modulation module 54 increases the duty cycle of the control signal $S_{c1}$ and $S_{c2}$ during the enable sections (form less square waves). In other words, when the rotational speed of the motor 30 (the first rotational-speed value) increases, the duty cycle of the control signal $S_{c1}$ and $S_{c2}$ during the enable sections is also increased. To be noted, the above-mentioned rotational-speed threshold values (2000 rpm and 500 rpm) and duty cycles (20% and 90%) are for illustration only, and they can be modified depending on the requirements of the user. For example, when the upper rotational-speed threshold value is 1500 rpm, the constant duty cycle is 80%; or when the lower rotational-speed threshold value is 300 rpm, the constant duty cycle is 15%.

The bi-power motor controlling system 2 of the present invention is characterized in that the pulse width modulation process is applied to the control signals $S_{c1}$ and $S_{c2}$ ($S_{c3}$ and $S_{c4}$), which are to be transmitted to the driving circuit 53, for controlling the rotational speed of the motor 30. In more detailed, the sensor 51 firstly detects the phase commutation of the motor 30 to generate a phase-commutation sensing signal $S_{phase}$ and then output it to the controller 52. After receiving the phase-commutation sensing signal $S_{phase}$, the controller 52 retrieves the rotational speed of the motor 30 (the first rotational-speed value). Then, the pulse width modulation module 54 modulates the duty cycle of the control signals $S_{c1}$ and $S_{c2}$ ($S_{c3}$ and $S_{c4}$) during the enable sections in accordance with the rotational speed of the motor 30 and the relation table or equation, and then outputs a plurality of modulated control signals $S_{c1}$ and $S_{c2}$ ($S_{c3}$ and $S_{c4}$) to the corresponding switch units of the driving circuit 53 for driving the motor 30 to rotate. Meanwhile, the controller 52 also outputs a rotational-speed feedback signal $S_F$ to the system apparatus 40. In this case, the duty cycle during the enable sections as well as the rotational speed of the motor 30 is decreased after performing the pulse width modulation process with the control signal $S_{c1}$ and $S_{c2}$ during the enable sections. Thus, after realizing that the rotational speed of the motor 30 decreases according to the rotational-speed feedback signal $S_F$, the system apparatus 40 must increase the voltage of the first power $V_{CC1}$ to be supplied to the motor 30 so as to make the rotational speed of the motor 30 reach the rotational-speed target value. That is, the voltage of the first power VCC1 is increased from 2V-6V as shown in FIG. 6A to 6V-10V as shown in FIG. 6B. When the motor 30 reaches the target rotational speed, based on the equation of $P=I \times V$ and the condition of reaching the same target rotational speed (or the same power), the current I flowing through the motor 30 will decrease as the voltage of the motor 30 (the first power $V_{CC1}$) increases. Since the noise and the current I are in direct proportion, the noise of the motor 30 can be improved by utilizing the bi-power motor controlling system 2 to decrease the current I.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A bi-power motor controlling system, comprising:
   a motor;
   a system apparatus having a rotational-speed target value and outputting a first power and a second power, wherein the rotational-speed target value is used to determine a targeted rotational speed of the motor, and the first power is supplied to the motor; and
   a motor controlling apparatus electrically connected with the motor and the system apparatus, respectively, for receiving the second power, wherein the motor controlling apparatus detects a phase commutation of the motor to obtain a first rotational-speed value of the motor, adjusts a rotational speed of the motor to a second rotational-speed value in accordance with the first rotational-speed value, and generates a rotational-speed feedback signal to the system apparatus;
   wherein the system apparatus adjusts the outputted first power in accordance with the rotational-speed feedback signal to make the rotational speed of the motor reach the rotational-speed target value.

2. The bi-power motor controlling system according to claim 1, wherein the motor controlling apparatus comprises:
   a sensor for detecting the phase commutation of the motor to generate a phase-commutation sensing signal;
   a controller electrically connected with the sensor and the system apparatus for receiving the phase-commutation sensing signal and the second power, respectively, wherein the controller retrieves the first rotational-speed value of the motor in accordance with the phase-commutation sensing signal, generates a plurality of driving signals in accordance with the second power, and each of the driving signals comprises a plurality of enable sections and a plurality of disable sections;
   a driving circuit electrically connected with the motor and the controller; and
   a pulse width modulation module installed in the controller for performing a pulse width modulation on at least two of the driving signals during the enable sections in accordance with the first rotational-speed value so as to generate at least two control signals;
   wherein the controller outputs the control signals to the driving circuit for adjusting the rotational speed of the motor to the second rotational-speed value, and generates the rotational-speed feedback signal to the system apparatus.

3. The bi-power motor controlling system according to claim 2, wherein the driving circuit is a half-bridge circuit having a plurality of switch units, and the switch units are electrically connected between the controller and a plurality of coils of the motor.

4. The bi-power motor controlling system according to claim 3, wherein the switch units are turned on, respectively, during the enable sections of the control signals, and are turned off, respectively, during the disable sections of the control signals.

5. The bi-power motor controlling system according to claim 3, wherein each of the switch units is a transistor.

6. The bi-power motor controlling system according to claim 5, wherein collectors of the transistors are electrically connected with the coil of the motor, bases of the transistors are electrically connected with the controller, and emitters of the transistors are grounded.

7. The bi-power motor controlling system according to claim 2, wherein the driving circuit is a full-bridge circuit having a plurality of switch units, and the switch units are electrically connected between a coil of the motor and the controller.

8. The bi-power motor controlling system according to claim 7, wherein each of the switch units is a transistor.

9. The bi-power motor controlling system according to claim 8, wherein collectors of the transistors are electrically connected with the coil, bases of the transistors are electrically connected with the controller, emitters of two of the transistors are electrically connected with the system apparatus, and emitters of other two of the transistors are grounded.

10. The bi-power motor controlling system according to claim 9, wherein the transistors with the emitters thereof connecting to the system apparatus receive the control signals, and the transistors with the emitters thereof being grounded receive the driving signals.

11. The bi-power motor controlling system according to claim 2, wherein the controller is a microprocessor.

12. The bi-power motor controlling system according to claim 2, wherein the pulse width modulation module comprises a relation table or a relation equation of the rotational speed and a duty cycle, so that the pulse width modulation module modulates a duty cycle of the control signals during the enable sections in accordance with the first rotational-speed value and the relation table or the relation equation.

13. The bi-power motor controlling system according to claim 12, wherein:
the pulse width modulation module has at least one rotational-speed threshold value;
when the first rotational-speed value does not match the rotational-speed threshold value, the pulse width modulation module modulates the control signals to be with a constant duty cycle during the enable sections; and
when the first rotational-speed value matches the rotational-speed threshold value, the pulse width modulation module modulates the control signals to be with a variable duty cycle during the enable sections.

14. The bi-power motor controlling system according to claim 13, wherein:
when the first rotational-speed value matches the rotational-speed threshold value, the first rotational-speed value and the duty cycle are in direct proportion;
when the first rotational-speed value retrieved by the pulse width modulation module reflects that the motor is in a low rotational speed, the pulse width modulation module decreases the duty cycle of the control signals during the enable sections; and
when the first rotational-speed value retrieved by the pulse width modulation module reflects that the motor is in a high rotational speed, the pulse width modulation module increases the duty cycle of the control signals during the enable sections.

15. The bi-power motor controlling system according to claim 13, wherein the first rotational-speed value and the duty cycle are in a linear relation.

16. The bi-power motor controlling system according to claim 13, wherein:
when the rotational-speed threshold value is 500 rpm, the constant duty cycle of the control signals during the enable sections is 20%; and when the rotational-speed threshold value is 2000 rpm, the constant duty cycle of the control signals during the enable sections is 90%.

17. The bi-power motor controlling system according to claim 1, wherein each of the first power and the second power is a DC voltage signal.

18. The bi-power motor controlling system according to claim 1, wherein the first power is a pulse-type power signal.

19. The bi-power motor controlling system according to claim 18, wherein the first power is a triangle-wave signal, a square-wave signal or a pulse width modulation signal.

20. The bi-power motor controlling system according to claim 1, wherein the first power is an adjustable voltage signal.

21. The bi-power motor controlling system according to claim 20, wherein the system apparatus adjusts the outputted first power in accordance with the rotational-speed feedback signal, and the system apparatus increases the outputted first power when the rotational-speed feedback signal reflects that the rotational speed of the motor is lower than the rotational-speed target value.

22. A motor controlling apparatus electrically connected with a motor, the motor controlling apparatus and the motor receiving a first power and a second power, respectively, from outside, and the first power being an adjustable voltage signal, the motor controlling apparatus comprising:
a sensor for detecting a phase commutation of the motor to generate a phase-commutation sensing signal;
a controller electrically connected with the sensor and the system apparatus for receiving the phase-commutation sensing signal and the second power, wherein the controller retrieves a first rotational-speed value of the motor in accordance with the phase-commutation sensing signal, generates a plurality of driving signals in accordance with the second power, and each of the driving signals comprises a plurality of enable sections and a plurality of disable sections;
a driving circuit electrically connected with the motor; and
a pulse width modulation module installed in the controller for performing a pulse width modulation on at least two of the driving signals during the enable sections in accordance with the first rotational-speed value so as to generate at least two control signals;
wherein the controller outputs the control signals to the driving circuit for adjusting the rotational speed of the motor to the second rotational-speed value, and generates the rotational-speed feedback signal to the system apparatus.

23. The motor controlling apparatus according to claim 22, further electrically connected with a system apparatus, wherein the system apparatus has a rotational-speed target value for determining a targeted rotational speed of the motor, outputs the first power and the second power to the motor and the motor controlling apparatus, respectively, receives a rotational-speed feedback signal reflecting the second rotational-speed value from the controller, and adjusts the outputted first power in accordance with the rotational-speed feedback signal to make the rotational speed of the motor reach the rotational-speed target value.

24. The motor controlling apparatus according to claim 23, wherein the system apparatus increases the outputted first power when the rotational-speed feedback signal reflects that the rotational speed of the motor is lower than the rotational-speed target value.

25. The motor controlling apparatus according to claim 22, wherein the driving circuit is a half-bridge circuit having a plurality of switch units, and the switch units are electrically connected between the controller and a plurality of coils of the motor.

26. The motor controlling apparatus according to claim 25, wherein the switch units are turned on, respectively, during the enable sections of the control signals, and are turned off, respectively, during the disable sections of the control signals.

27. The motor controlling apparatus according to claim 25, wherein each of the switch units is a transistor.

28. The motor controlling apparatus according to claim 27, wherein collectors of the transistors are electrically connected with the coil of the motor, bases of the transistors are electrically connected with the controller, and emitters of the transistors are grounded.

29. The motor controlling apparatus according to claim 22, wherein the driving circuit is a full-bridge circuit having a plurality of switch units, and the switch units are electrically connected between a coil of the motor and the controller.

* * * * *